United States Patent [19]

Chu et al.

[11] Patent Number: 4,791,088
[45] Date of Patent: Dec. 13, 1988

[54] CRYSTALLINE LAYERED MATERIAL MCM-20 AND PROCESS FOR ITS PREPARATION

[75] Inventors: Pochen Chu, West Deptford; Guenter H. Kuehl, Cherry Hill; Michael E. Landis, Woodbury, all of N.J.

[73] Assignee: Mobil Oil Corporation, New York, N.Y.

[21] Appl. No.: 939,265

[22] Filed: Dec. 9, 1986

Related U.S. Application Data

[63] Continuation of Ser. No. 797,276, Nov. 12, 1985, abandoned.

[51] Int. Cl.$^4$ .............................................. B01J 21/08
[52] U.S. Cl. ................................... 502/232; 502/240; 423/326; 423/328; 423/332
[58] Field of Search ............... 502/232, 240; 423/326, 423/328 C, 328 M, 328 T

[56] References Cited

U.S. PATENT DOCUMENTS

| | | | |
|---|---|---|---|
| 4,410,637 | 10/1983 | Kortbeek et al. | 518/714 |
| 4,481,174 | 11/1984 | Baacke et al. | 423/306 |
| 4,482,531 | 11/1984 | Kuehl | 423/329 |
| 4,578,258 | 3/1986 | Rieck | 423/325 |
| 4,581,213 | 4/1986 | Rieck | 423/325 |
| 4,582,693 | 4/1986 | Desmond et al. | 423/329 |
| 4,600,503 | 7/1986 | Angevine et al. | 208/251 H |
| 4,626,421 | 12/1986 | Zones | 423/326 |
| 4,632,815 | 12/1986 | Valyocsik | 423/329 |

OTHER PUBLICATIONS

Hans P. Eugster, "Hydrous Sodium Silicates from Lake Magadi, Kenya, Precursors of Bedded Chert," *Science*, pp. 1177-1180, vol. 157, 5, Jul. 1967.
U.S. application Ser. No. 878,787, filed Jun. 27, 1986—Landis et al.
U.S. patent application Ser. No. 687,414 filed 12/28/87.
U.S. patent application Ser. No. 797,084 filed 11/12/85.

*Primary Examiner*—Helen M. S. Sneed
*Assistant Examiner*—Jackson Leeds
*Attorney, Agent, or Firm*—A. J. McKillop; M. G. Gilman; L. P. Hobbes

[57] ABSTRACT

Layered silicate materials of high thermal stability and surface area which contain interspathic oxides such as silica as prepared by treating a layered silicate, with organic cation, to spread the layers apart. A compound such as tetraethylorthosilicate, capable of forming said oxide, is thereafter introduced between the layers. The resulting product is treated to form the oxide, e.g. by hydrolysis, to produce the layered silicate material. The resulting product may be employed as a catalyst material in the conversion of hydrocarbons.

11 Claims, 5 Drawing Sheets

CRYSTALLINE LAYERED MATERIAL MCM-20 AND PROCESS FOR ITS PREPARATION

This is a continuation of copending application Ser. No. 797,276, filed on Nov. 12, 1985, now abandoned.

FIELD OF THE INVENTION

The invention is directed to layered silicates which are pillared. Specifically, in accordance with the invention, a pillared layered silicate is produced by a novel method which includes treating the layered silicate with a compound of Si, Al, Fe, Cr, B, Ca, Mg, or mixtures of such compounds. The intercalated product is a stable crystalline material with improved sorptive properties and larger basal spacing than that of the layered silicate precursor.

BACKGROUND OF THE INVENTION

The fundamental unit of crystalline silicate structures is a tetrahedral complex consisting of the Si cation in a tetrahedral coordination with four oxygens. In some structures, the tetrahedra link to form chains which result in fibrous needlelike structures. Single chains result when $SiO_4$ tetrahedra are joined at one oxygen atom.

In other silicate structures, the tetrahedra are linked in layers or sheets as in mica minerals. Similar arrangement of the tetrahedra are found in clay minerals wherein two types of sheets may exist, one consisting of aluminum, iron or magnesium ions in a six-fold coordination with oxygens. These layer or sheet structures result from linking between three corners of each $SiO_4$ tetrahedron to neighboring tetrahedra. Breck, *Zeolite Molecular Sieves*, John Wiley & Sons, A Wiley Interscience, Publication New York, London, Sydney, Toronto, p. 31 (1974) reports that these layer or sheet structures do not have three-dimensional stability and may expand if the layers are forced apart by water, other molecules or ions. Thus, these differ from silicates referred to as zeolites. By comparison, in the family of materials referred to as zeolites, the $SiO_4$ tetrahedra are linked in three dimensions by a mutual sharing of all of the oxygen atoms; and thus the family of zeolites is characterized by a resulting three dimensional framework structure.

The difference in the crystallographic order of layered silicates compared to zeolites portend other differences, for example, differences in sorptive capacities, surface area and relative stability. Theoretically, it is possible to alter, e.g. increase, the sorptive capacities, surface area and stability. The ability to control these properties in the layered silicate is advantageous for practical reasons, related to the field of use of these products.

Pillaring or intercalation, the two words being used interchangeably herein, of a layered silicate can effect alteration, e.g. increase, of the properties of sorption, surface area and stability, compared to the precursor layered silicate substrate. The terms "pillar", "pillaring", "intercalated" and "intercalation" mean insertion of a material between the layers of the layered silicate substrate. Cf. Loeppert, Jr. et al, *Clays and Clay Minerals* 27(3), 201–208 (1979).

The idea of intercalation has been reduced to specific embodiments disclosed in e.g. U.S. Pat. Nos. 4,248,739 and 4,367,163. The present invention was made because those prior intercalation techniques were ineffectual to alter the properties of a novel synthetic layered silicate, designated MCM-20 having an X-ray diffraction pattern the significant characteristic lines of which are described in Table 1. High molecular weight polymeric cationic hydroxy metal complexes as taught by U.S. Pat. No. 4,248 739 were ineffectual to exchange into MCM-20. The product from the reaction of base MCM-20 with $SiCl_4$ in acetylacetone as taught by U.S. Pat. No. 4,367,163 did not have improved adsorption. The base sample of MCM-20 treated by the present invention yielded, on the other hand, a material of high surface area and good crystallinity after high temperature calcination for a long period of time.

SUMMARY OF THE INVENTION

The invention is directed to a pillared layered silicate which comprises between its layers an oxide of an element selected from groups IB, IIB, IIIA, IIIB, IVA, IVB, VA, VB, VIA, VIIA and VIIIA of the Periodic Table. This oxide may be in amorphous, crystalline or zeolite form. The present invention is particularly useful in that it permits the preparation of pillared layered silicate materials of relatively high d-spacing, e.g., greater than about 10, 11, 12, 15, 18, 20, or even 30 angstroms. Such materials are capable of being exposed to severe conditions such as those encountered in calcining without significant decrease in interlayer distance. The amount of oxide deposited between the layers and contained within the final product can be greatly varied because the oxide precursor species are introduced in an electrically neutral form such that the amount of material incorporated within the layered oxide is not dependent upon the charge density of the original layered oxide. This allows the formation of materials with widely varying interlayer spacing, further distinguishing the present invention from the prior art.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

In one embodiment of the invention, the pillared synthetic layered silicate comprises $SiO_2$ or $(RO)_4Si$ or hydrolysis products of $(RO)_4Si$ interposed between lamina of the layered silicate. In other words, the intercalated product comprises said lamina supported or pillared by material comprising $SiO_2$ or $(RO)_4Si$ or hydrolysis products of $(RO)_4Si$. The pillared product is formed by hydrolysis of $(RO)_4Si$ in the $(RO)_4Si$ impregnated layered silicate.

In accordance with the invention, the invention is directed to a process which comprises swelling the layered silicate prior to treatment with the pillaring agent, which provides said oxide, by treatment with an aliphatic amine or by a mixture of said aliphatic amine and polar solvent for said aliphatic amine.

In another embodiment, in which the treatment of the layered silicate comprises contacting it with the alkylamine, that layered silicate is pretreated with acid.

The products pillared or intercalated by interposing deposits of said oxides between the lamina of the layered silicate are characterized by sorption properties and stability which differs from that of the precursor layered silicate.

BRIEF DESCRIPTION OF THE DRAWINGS

The scans of FIGS. 1–5 were derived with the use of the software "APD Peak Algorithm", as described below, and are computer generated plots of the square-root of the intensity v. 2 theta (the Bragg angle).

DETAILED DESCRIPTION OF THE INVENTION

Various layered silicates can be intercalated in accordance with the invention. As indicated above, layered silicates are those comprising $SiO_4$ tetrahedra linked in 2 dimensions, thereby forming lamina sheets or layers, through three corners of the $SiO_4$ tetrahedra. These layered silicates can be aluminosilicates. Thus, the $SiO_2:Al_2O_3$ ratio in the layered silicates can range from greater than 12 to infinity ($\infty$). In a specific embodiment of the invention, the layered silicate is one designated MCM-20. That layered silicate, in the dried "as synthesized" form, exhibits an X-ray diffraction pattern, the significant lines of which are listed in Table 1.

TABLE 1

Significant X-ray Diffraction Lines of MCM-20

| MCM-20A (Product of Examples C & E) | | MCM-20B (Product of Example I) | |
|---|---|---|---|
| d,A | I | d,A | I |
| 19.9 ± 0.5 | VS | 21.0 ± 4.0 | M-VS |
| 5.18 ± 0.1 | W | 5.09 ± 0.1 | W |
| 4.95 ± 0.1 | W | 4.85 ± 0.1 | W |
| 4.33 ± 0.08 | W | 4.48 ± 0.08 | W |
| 3.96 ± 0.08 | W-M | 3.95 ± 0.08 | W |
| 3.70 ± 0.07 | W-M | 3.70 ± 0.07 | W-M |
| 3.58 ± 0.07 | VS | 3.53 ± 0.07 | M-VS |
| 3.37 ± 0.07 | VS | 3.36 ± 0.07 | M-VS |
| 3.17 ± 0.06 | W | 3.20 ± 0.06 | M |
| 1.855 ± 0.02 | M | 1.85 ± 0.02 | M-S |

The MCM-20 can be identified in the as-crystallized form, in terms of mole ratios of oxides in the anhydrous state, as follows:

(3.5 to 6.0RO.(0 to 1)$M_{2/n}$O.$Al_2O_3$.(100 to 5000)$SiO_2$ wherein M is at least one cation having a valance n and R, being divalent, is a cation derived from the diazabicyclo[2.2.2]octane adduct of an $\alpha$, $\omega$-dihaloalkane. The alumina content is less than about 2%. As will be seen below, calcination of the novel as-synthesized silicate produces a phase change which is reflected by X-ray powder diffraction pattern of the as-synthesized silicate compared to the X-ray pattern of the calcined silicate. This phase change suggests that the silicate is a layered silicate.

MCM-20 was prepared by crystallization from a reaction mixture containing a source of silicon oxide(s), a source of aluminum oxide, an alkali hydroxide and an organic salt which is the adduct of the reaction between diazabicyclo [2.2.2]octane and $\alpha$, $\omega$-dihaloalkane; although the two halogen atoms of the $\alpha$, $\omega$-dihaloalkane may be fluorine, chlorine, bromine or iodine, preferably that compound is an $\alpha$, $\omega$-dibromoalkane. More particularly, the organic salt is the product of the reaction of one molecule of $\alpha$, $\omega$-dihalo-n-alkane with two molecules of diazabicyclo [2.2.2]octane (DABCO) in which only one of each of the two DABCO nitrogen atoms is quaternized.

The products are of the formula:

where n=4 or 5 and X is halogen, fluorine, chlorine, bromine or iodine. The organic products are produced by reacting the DABCO with the $\alpha$, $\omega$-dibromoalkane in a molar ratio of about 2:1, in a solvent therefor. Isolation of the resulting adduct may be by way of conventional extraction. The synthesis of the halogen salt of DABCO-$C_n$ diquat is conducted with constant stirring in methanol at the temperature of about 45°–55° C. in the manner described in detail by T. P. Abbiss and F. G. Mann in Triethylenediamine (1,4-diazabicyclo[2,2,2]octane) and Hexaethylenetetramine. The Interaction of Triethlyenediamine and Dibromomethane, 1,2-Dibromoethane, and 1,3-Dibromopropane. JOURNAL OF THE CHEMICAL SOCIETY, published by Chemical Society (London, 1964), pp 2248–2254, the entire contents of which are incorporated herein by reference. If desired, the halogen salt can be converted to the hydroxide form of the DABCO-$C_n$-diquat in any conventional manner.

The new silicate MCM-20 is crystallized from a reaction mixture containing sources of silicon oxide, of alkali metal oxide, the organic salt, water, and, optionally an oxide of aluminum and having a composition, in terms of mole ratios, within the following ranges:

| | Broad | Preferred |
|---|---|---|
| $SiO_2/Al_2O_3$ | 100–$\infty$ | 140–5000 |
| $H_2O/(RO + M_2O)$ | 50–250 | 80–150 |
| $OH^-/SiO_2$ | 0.05–0.50 | 0.1–0.40 |
| $RO/(RO + M_2O)$ | 0.30–0.90 | 0.40–0.80 | wherein R is the cationic form of the organic salt, M is an alkali metal ion. It is noted that the $SiO_2/Al_2O_3$ mole ratio for the reaction mixture of the present invention can vary over a wide range with an essentially unlimited upper end. It can be infinity or as reasonably close thereto as possible. The reaction mixture is maintained at crystallization conditions until the crystals of silicate are formed.

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing the silicate can be supplied by one or more essential reactants and they can be mixed together in any order. For example, any oxide can be supplied by an aqueous solution, e.g. alkali ion as potassium or sodium hydroxide, or a suitable silicate aluminate or other salt. The directing agent compound (the organic salt) supplying an organic cation, may be in various forms, such as, for example, the hydroxide or a salt, e.g., halide, such as bromide.

The reaction mixture can be prepared either batchwise or continuously. Crystal size and crystallization time for the new silicate composition will vary with the exact nature of the reaction mixture employed. In general, the particle size of the silicate, as synthesized, hereby is 2 to 10 microns. Individual crystallites may vary from 0.1–2 microns in size.

Crystallization conditions include elevated temperatures broadly ranging from 120° C. to 225° C., preferably from 140° C. to 200° C.

Pressures during crystallization are the autogenous pressures. The pH of the reaction mixture will range from 13.5 to 10.0. Reaction times with resultant crystal formation will depend on temperature conditions and will broadly range from about 3 to about 25 days, but more preferably will range from about 5 to about 18 days.

Digestion of the reaction mixture is carried out until the crystallization is complete. The solid product is separated from the reaction medium by filtration, after cooling to room temperature.

The product dried at room temperature exhibits an X-ray diffraction pattern, the significant lines of which are listed in Table 1. The product calcined at 550° C. exhibits an X-ray diffraction pattern the significant lines of which are listed in Table 2:

TABLE 2

| Significant X-ray Diffraction Lines of MCM-20 Calcined at 550° C. | | | |
|---|---|---|---|
| MCM-20A | | MCM-20B | |
| d,A | I | d,A | I |
| 13.1 ± 0.2 | W-M | 12.9 ± 0.2 | W-M |
| 7.40 ± 0.1 | W | 7.36 ± 0.1 | W |
| 6.88 ± 0.1 | W | 6.87 ± 0.1 | W |
| 6.49 ± 0.1 | W | 6.4 | W |
| 6.05 ± 0.1 | W | 6.0 | W |
| 5.30 ± 0.1 | W | | |
| 4.55 ± 0.08 | W | | |
| 4.09 ± 0.08 | W | | |
| 3.69 ± 0.07 | W | 3.76 ± 0.07 | W |
| 3.43 ± 0.07 | VS | 3.41 ± 0.07 | VS |
| 1.856 ± | W | 1.857 ± | W |

Figure 1:
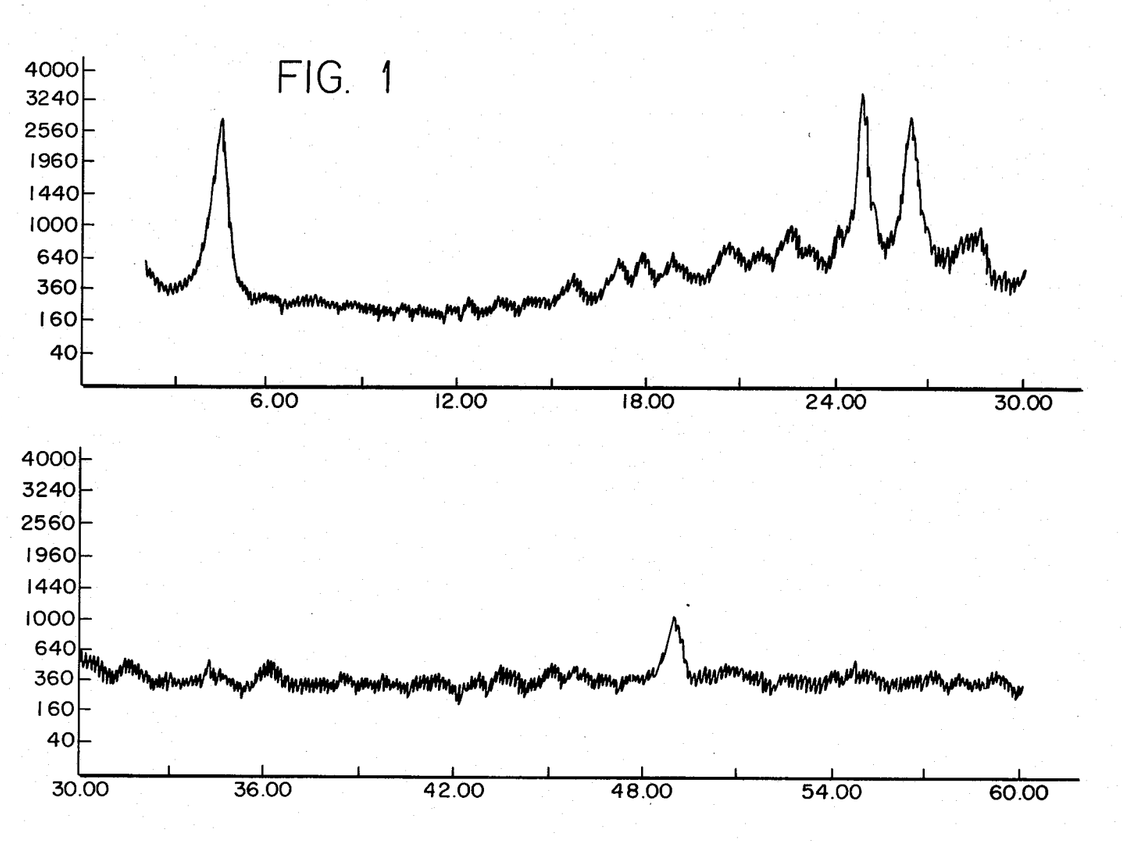
FIG. 1 is an X-ray diffraction trace of a sample of the as-synthesized product of Example C.
Figure 2:
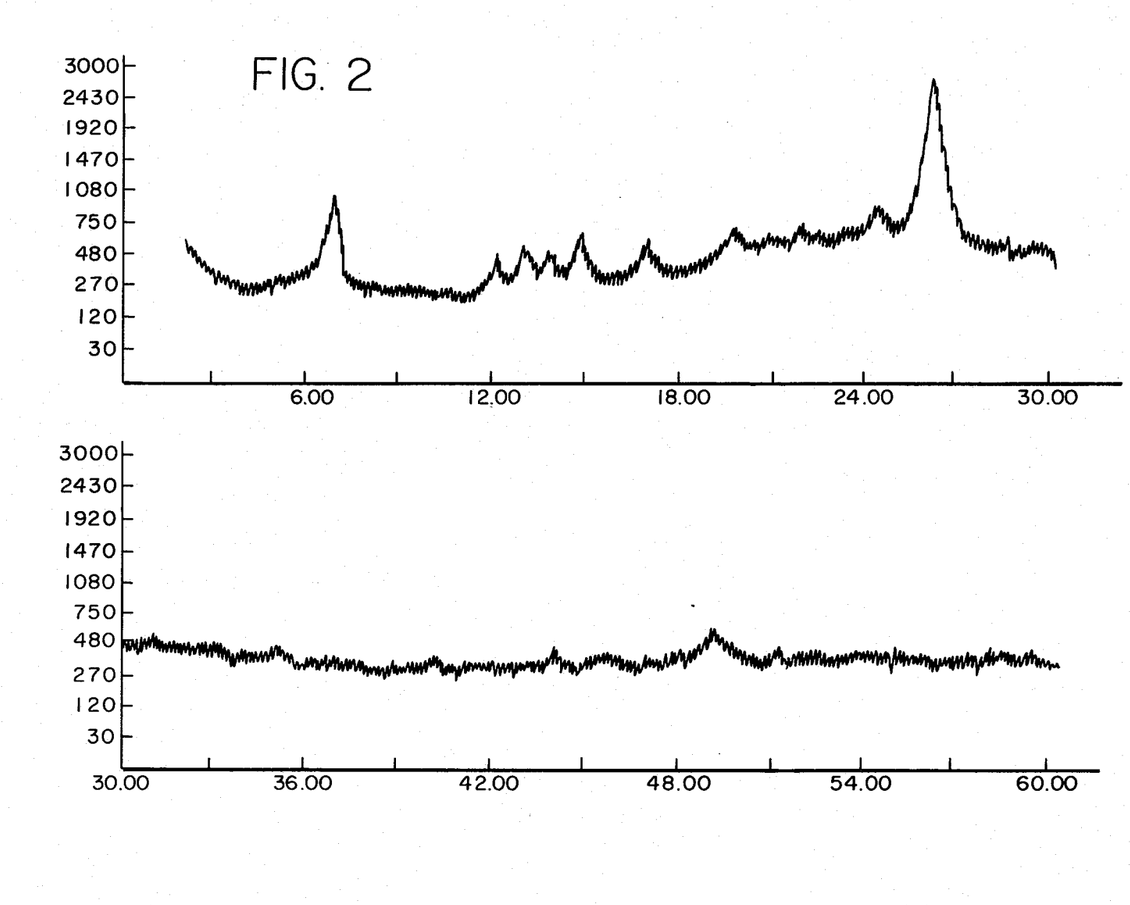
FIG. 2 is an X-ray diffraction trace of a sample of the product of Example C calcined at 538° C.
Figure 3:
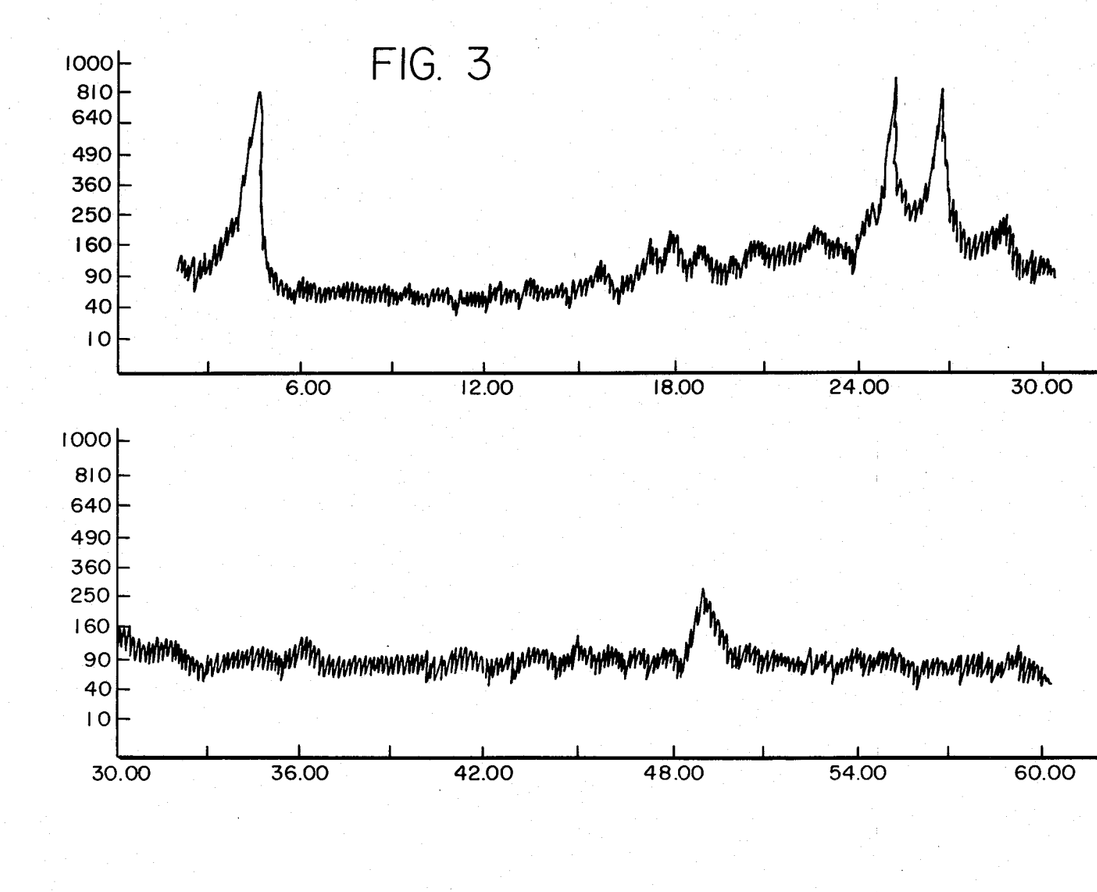
FIG. 3 is an X-ray diffraction trace of a sample of the as-synthesized product of Example E.
Figure 4:
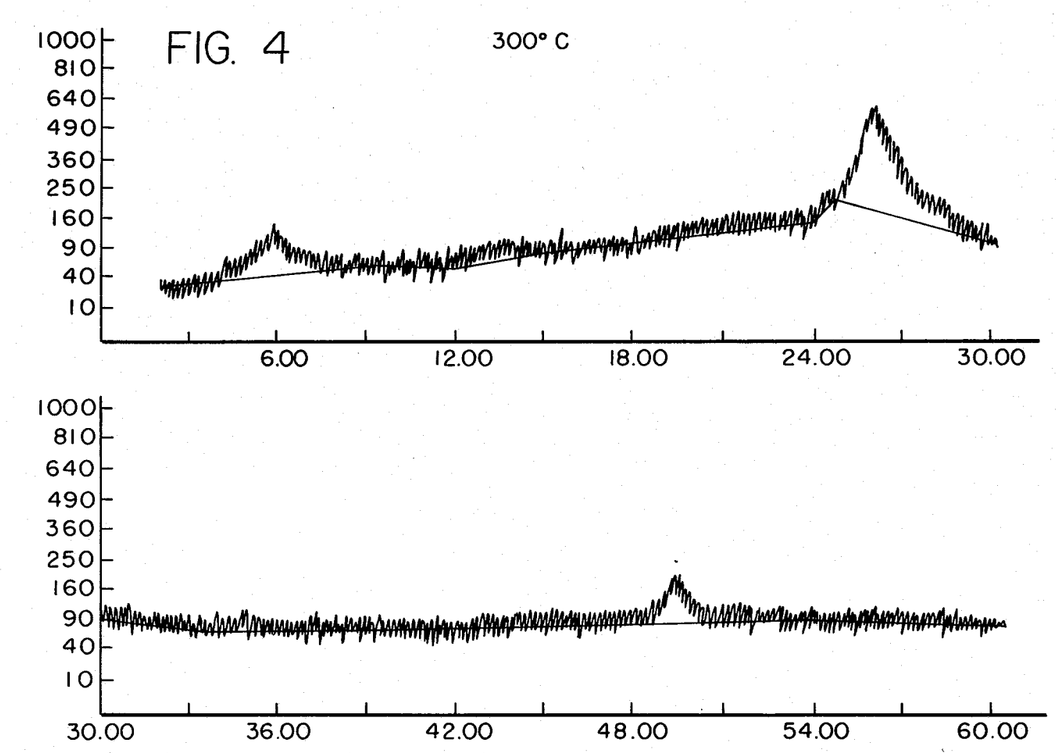
FIG. 4 is an X-ray diffraction trace of the product of Example E heated for 5 hours at 300° C.
Figure 5:
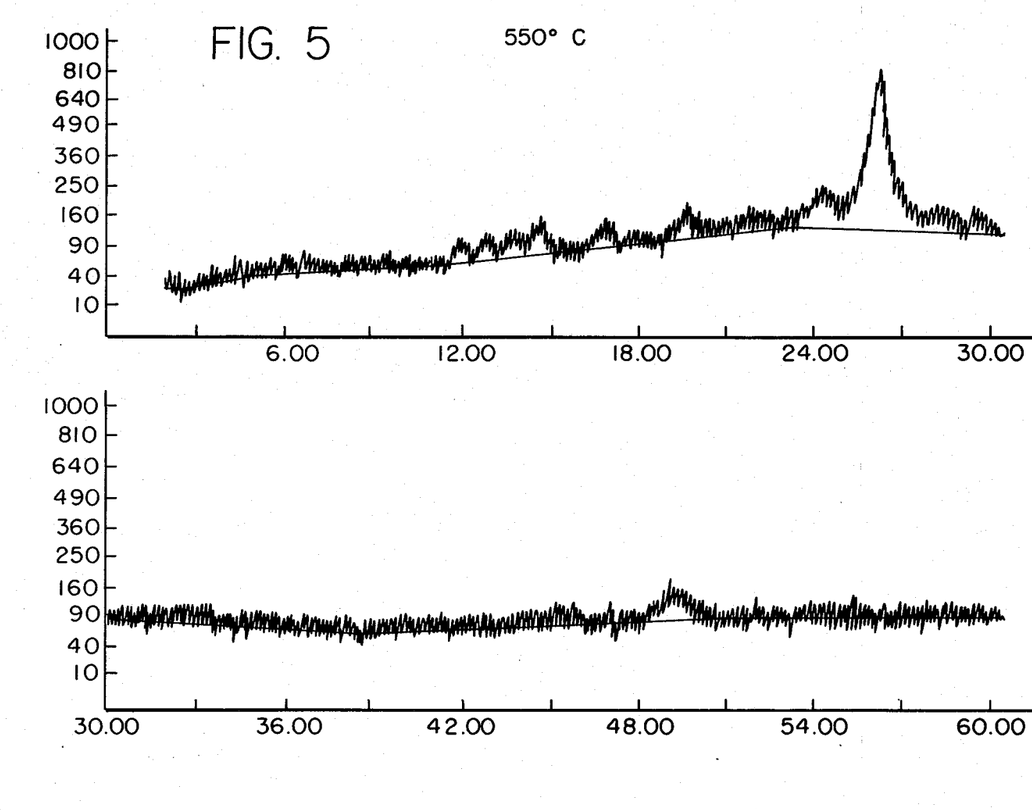
FIG. 5 is an X-ray diffraction trace of the Example E product calcined for 3 hours at 550° C.

The phase change on calcination is gradual and coincides with the loss of organic nitrogen compound, as demonstrated by the stepwise calcination of the product of Ex. E (see x-ray patterns of FIGS. 3–5). Of somewhat smaller crystallite size than the product of Ex. C, it gave essentially the same x-ray diffraction pattern except for an additional low-angle shoulder of the 4.4°$2\theta$ peak and an overall lower intensity of the pattern. The material contained slightly less nitrogen, 2.6%, than the product of Ex. C, 2.99%. Upon heating at 300° C. for 5 hours, half of the nitrogen was lost and, besides other changes, the low-angle peak moved from 4.4 to 5.8°$2\theta$. Calcination for 3 hours at 550° C. removed essentially all of the nitrogen. The product gave an x-ray diffraction pattern that differed from that of the calcined product of Ex. 1 only in that the low-angle peak at 13.15Å(6.72°$2\theta$) had a relative intensity of only 3.

These X-ray diffraction data were collected with the Philips APD-3600 X-ray system, using copper K-alpha radiation. The positions of the peaks, expressed in degrees 2 theta, where theta is the Bragg angle, were determined by step-scanning at 0.02 degrees of 2 theta intervals and a counting time of 2 seconds for each step. The interplanar spacings, d, measured in Angstrom units (Å), and the relative intensities of the lines, $I/I_o$, where $I_o$ is one-hundredth of the intensity of the strongest line, including subtraction of the background, were derived with the use of the software "APD Peak Algorithm". The relative intensities are given in terms of the symbols vs=very strong, s=strong, m=medium and w=weak. The silicate compositions of the present invention may exhibit minor variations from the X-ray diffraction pattern in each of Tables 1 and 2, for example, some minor shifts in interplaner spacing and minor variation in relative intensity. Such minor variations can occur, depending on the silica to alumina ratio and the identity of cations present.

That gradual phase change of the dried silicate structure (which coincides with loss of organic nitrogen compounds) is borne out by the fact that the calcined silicate has a unique X-ray diffraction pattern different from that of the dried as-synthesized silicate. The X-ray diffraction pattern of the calcined form of the novel silicate is listed in Table 2. Calcination of the dried as-synthesized novel silicate is undertaken at temperatures effective to cause the phase change which coincide with loss of the organic nitrogen compounds. At temperatures used in the Examples, 300°–550° C., calcination was undertaken in an inert atmosphere at atmospheric pressures. Lower temperatures, as well as higher temperatures of calcination may be employed. Calcination times are inversely related to calcination temperatures.

In the pillared layered silicate of the present invention, the layered silicate substrate is impregnated with a reactant which will give rise to a supporting silica structure between the layers of the layered silicate. The result of pillaring (or intercalation) is to increase the basal spacing of the layers of the layered silicate, to increase the sorptive capacities and to render it more stable, compared to the layered silicate prior to intercalation.

In one embodiment, intercalation is achieved by impregnating the layered silicate with a pillaring reagent which is hydrolyzable. That impregnation may require swelling the layered silicate prior to impregnating with the pillaring reagent.

Swelling may be achieved, by treating the layered-silicate under swelling conditions, with swelling reactant which is an aliphatic amine of the formula $RNH_2$ wherein R is a hydrocarbon group or a mixture of said $RNH_2$ and a polar solvent for said $RNH_2$. Swelling conditions may be at ambient conditions of temperature and pressure, for periods of time ranging from 1 hour to about 24 hours. Elevated temperatures up to about 100° C. accelerate the swelling stage. The foregoing swelling treatment results in the formation of a layered silicate of enhanced interlayer separation depending upon the size of the organic cation introduced via said aliphatic amine. In one embodiment, a series of said swelling stages can be carried out. For example, the organic cation introduced via said aliphatic amine may be exchanged with another organic cation of greater size, thus increasing the interlayer separation in a step-wise fashion.

The amount of the swelling reagent may only be sufficient to impregnate the layered silicate. As indicated above, the swelling reagent may be an aliphatic amine, e.g., an alkylamine, $RNH_2$, wherein R is alkyl group of 3 to 15 carbon atoms straight or branched chain. The amount of alkylamine used has not been determined to be critical; however, results thus far obtained appear to indicate that the mole ratio of nitrogen (N) of the amine to Si (of the layered silicate), of 0.5 to 1, is optimal. Swelling with the alkylamine in the examples below was conducted on the uncalcined "as-synthesized" layered silicate. The uncalcined "as-synthesized" layered silicate had been subjected to a pre-treatment with an acid solution, prior to swelling. Acid treatment of the MCM-20 inter alia removed organic cation from the "as-synthesized" layered silicate and thus was undertaken for a time sufficient to remove at least a part of the organic.

Polar solvents for swelling reagents include water; alcohols, such as methanol, ethanol, propanol, and the like; ketones such as acetone, methylethylketone and the like; methylene chloride, dimethylsulfoxide, dimethylformamide and hexamethylphosphoramide.

Impregnation of the layered silicate with a pillaring reagent is the critical step for intercalation and pillaring the layered silicate.

Pillaring agents used in accordance with the invention are those which are capable of penetrating the layers of the layered silicate, and are capable of forming, between the layers of said layered silicate, an oxide of an element selected from groups IB, IIB, IIIA, IIIB, IVA, IVB, VA, VB, VIA, VIIA and VIIIA of the Periodic Table and mixtures of said elements. That oxide may be in amorphous, crystalline or zeolite form. In a preferred embodiment, the pillaring agents are hydrolyzable to form the oxide pillars. The present invention is particularly useful in that it permits the preparation of pillared layered oxide materials of relatively high d-spacing, e.g., greater than about 10, 11, 12, 15, 18, 20, or even 30 angstroms. Such materials are capable of being exposed to severe conditions such as those encountered in calcining without significant decrease in interlayer distance. Finally, the amount of oxide contained within the final product can be greatly varied because the oxide precursor species are introduced in an electrically neutral form such that the amount of material incorporated within the layered silicate is not dependent upon the charge density of the original layered silicate. This allows the formation of materials with widely varying interlayer spacing. For example, the pillaring agents may be compounds of Si, Al, Fe, Cr, B, Ca, Ga and Mg, used alone or in combination. Preferably, they are compounds of Si and Al. Aluminum compounds can be selected from those including $AlX_3$ (wherein X is halide and preferably is chlorine or bromine); $AlR_3$ (wherein R is alkyl of 1–10 carbon atoms, straight or branched chain); $Al(OR)_3$ (wherein R is alkyl of 1 to 10 carbon atoms straight or branched chain), such as aluminum isopropoxide. Silicon compounds can be $SiX_4$ (wherein X is halide and preferably is chlorine or bromine) siloxanes and tetraalkylorthosilicates. The tetraalkylorthosilicate may be referred as $(RO)_4Si$ wherein (R) is alkyl of 1 to 8 carbon atoms; the exact nature of R is not critical per se except insofar as the compound $(RO)_4Si$ should be hydrolyzable, to hydrolysis products such as $SiO_2$, and capable of penetrating the layered silicate. For health reasons, it is preferred not to employ the $(RO)_4Si$ in which R is methyl. Thus $(RO)_4Si$ impregnation of the layered silicate is accompanied by or followed by hydrolysis of the $(RO)_4Si$ compound. For example, when the $(RO)_4Si$ impregnation is undertaken subsequent to acid treatment and alkyl amine impregnation of MCM-20, as in some of the examples, hydrolysis of $(RO)_4Si$ occurs to produce $SiO_2$ and/or hydrolysis derivatives of $(RO)_4Si$. Parenthetically, hydrolysis of the $(RO)_4Si$ also results in the production of the corresponding alcohol. The amount of $(RO)_4Si$ used should be sufficient to maintain the spacing between the layers of the swollen layered silicate. The amount of $(RO)_4Si$ should be less than that amount effective to plug the interlayer spaces of the silicate. This intercalation may be undertaken at ambient conditions of temperature and pressure.

The intercalated silicate or its calcined product, prepared in accordance herewith, can have the original inorganic cations associated therewith replaced by a wide variety of other cations according to techniques well known in the art. It has not been established whether the organic cations can be removed from the as-synthesized form by ion-exchange. In any case, the silicate is expected to be more selective for the organic than for the replacing cation. Typical replacing cations include hydrogen, ammonium and metal cations including mixtures thereof. Of the replacing metallic cations, particular preference is given to cations of metals such as rare earths, Mn, Ca, Mg, Zn, Rh, Pd, Pt, Ni, Cu, Ti, Al, Sn, Fe and Co.

Thus, in accordance with Examples 4 and 5 hereof, the uncalcined pillared layered silicate is treated with a source of aluminum to increase the aluminum content thereof, as reflected by an increase in alpha value. Calcination at temperatures up to about 1000° F. followed that treatment with a source of aluminum. As indicated in Examples 4 and 5, a second treatment with the source of aluminum and recalcination may be performed seriatim. As suggested by those examples, the source of aluminum was one which can be used in a solution form. Other treatment, akin to impregnation and ion-exchange of zeolites, to incorporate hydrogenation/dehydrogenation components into the pillared zeolites can be undertaken. Such hydrogenation/dehydrogenation components can be selected from a source of at least one metal selected from Groups VIII, IB, IIB and VI of the Periodic Table and mixtures thereof. Incorporation of the hydrogenation/dehydrogenation component may be undertaken on the uncalcined pillared silicate. Such incorporation may be undertaken before, after or during that treatment of the pillared silicate to increase its aluminum content described above.

Typical ion exchange technique would be to contact the synthetic silicate with a salt of the desired replacing cation or cations. Although a wide variety of salts can be employed, particular preference is given to chlorides, nitrates, sulfates and acetates.

Representative ion exchange techniques are disclosed in a wide variety of patents including U.S. Pat. Nos. 3,140,249, 3,140,251 and 3,140,253.

Following contact with the salt solution of the desired replacing cation the synthetic silicate is then preferably washed with water and dried at a temperature ranging from 65° C. to about 200° C. and thereafter may be calcined in air or other inert gas at temperatures ranging from about 200° C. to about 600° C. for periods of time ranging from 1 to 48 hours or more.

The novel intercalated silicate is distinct from known clay and zeolitic materials. Its high $SiO_2/Al_2O_3$ ratio should make it more hydrophobic than clay. The material has a high surface area and exhibits superior hydrocarbon sorptive properties. These properties should make the new silicate more versatile than clay as a catalyst carrier. Its measured alpha value suggests its efficacy as a catalyst. The resulting calcined products exhibit high surface area, e.g., greater than 200, 300, or even 400 m$^2$/g, and thermal stability making them highly useful for hydrocarbon conversion processes as catalysts or catalytic supports. The products of the present invention may be used in the following particular processes:

(1) alkylation of benzene with ethylene or ethanol, and alkylation of toluene with methanol.
(2) disproportioning of toluene to produce para xylene
(3) cracking and hydrocracking
(4) isomeriation of n-paraffins and naphthenes
(5) reforming
(6) isomerization of substituted polyalkyl aromatics
(7) disproportioning of aromatics
(8) conversion of dimethylether and/or methanol or other low molecular weight alcohols into hydrocarbons
(9) polymerization of compounds which contain olefin or acetylene bonds
(10) conversion of aliphatic carbonyl compounds into at least partly aromatic hydrocarbons
(11) separation of ethylbenzene from other aromatic C8 hydrocarbons
(12) hydrogenation and dehydrogenation of hydrocarbons
(13) methanation
(14) oxidation
(15) dehydration of aliphatic compounds containing oxygen
(16) conversion of olefins into compounds of high octane number.

It may be desirable to use the new intercalated silicate in combination with a binder or matrix material resistant to the temperatures and other conditions employed in certain organic conversion processes, rather than neat. Conditions in hydrocarbon conversions can include pressures ranging from 1000–3000 psig, temperature ranging from 260°–482° C., LHSV from 0.1 to 5 and hydrogen gas flow rates of 1000 to 20,000 scf/bbl. Such matrix materials include active and inactive materials and synthetic or naturally occuring zeolites as well as inorganic materials such as clays, silica and/or metal oxides, e.g., alumina. The latter may be either naturally occuring or in the form of gelatinous precipitates, sols or gels including mixtures of silica and metal oxides. Use of a material in conjuction with the new silicate, i.e., combined therewith, which is active, may enhance the conversion and/or selectivity of a catalyst including the silicate in certain organic conversion processes. Inactive materials suitably serve as diluents to control the amount of conversion in a given process so that products can be obtained economically and orderly without employing other means for controlling the rate of reaction. Frequently, crystalline silicate materials have been incorporated into naturally occurring clays, e.g., bentonite and kaolin. These materials, i.e., clays, oxides, etc., function, in part, as binders for the catalyst. It is desirable to provide a catalyst having good crush strengh, because in a petroleum refinery the catalyst is often subjected to rough handling, which tends to break the catalyst down into powder-like materials which cause problems in processing.

Naturally occurring clays which can be composited with the hereby synthesized silicate include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the silicate hereby synthesized can be composited with a porous matrix material such as a silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and inorganic oxide gel matrix vary widely with the crystalline silicate content ranging from about 1 to about 90 percent by weight, and more usually in the range of about 2 to about 50 percent by weight of the composite.

In order to more fully illustrate the nature of the invention and the manner of practicing same, the following examples are presented. In the examples, whenever adsorption data are set forth for comparison of sorptive capacities for water, cyclohexane and n-hexane, they were determined as follows.

A weighed sample of the calcined adsorbant was contacted with the desired pure adsorbate vapor in an adsorption chamber, evacuated to 1 mm and contacted with 12 mm Hg of water vapor or 40 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the sorbant material, the decrease in pressure caused the monostat to open a valve which admitted more adsorbate vapor to the chamber to restore the above control pressures. Sorption was complete when the pressure change was not sufficient to activate the monostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica alumina cracking catalyst taken as an Alpha of 1 (Rate Constant=0.16 sec$^{-1}$). The Alpha Test is described in U.S. Pat. No. 3,354,078 and in *The Journal of Catalysis*, Vol. IV. pp. 522–529 (August 1965), each incorporated herein by reference as to that description. The silicate tested in this Alpha Test must be at least partially, in the hydrogen form. The conversion to the hydrogen form may be accomplished by contact of the silicate with an ammonium salt or acid solution followed by thermal treatment to eliminate ammonia and water from the silicate. The following examples serve to illustrate the invention.

EXPERIMENTAL

Examples 1–5 illustrate the invention. Examples A–K are directed to the preparation of MCM-20, which is the material prepared and used in Examples 1–5.

EXAMPLE A

Preparation of DABCO-$C_5$ - diquat dibromide

DABCO, 80 g, was dissolved in 100 ml methanol and placed in a 1 liter round-bottom flask equipped with a magnetic stirring bar, reflux condenser, thermometer, and addition funnel. 1,5-Dibromopentane, 82.4 g, was added at such a rate to keep the reaction temperature at 50°±5° C. After addition, the reaction mixture was stirred at room temperature for 2 hours. Then 300 ml of dry diethyl ether was added to separate the $C_5$-diquat as an oil from the solvents. The lower layer containing the product was separated from the upper layer. The solvent still present in the lower layer was evaporated by heating at 100° C. for 18 hours at 100 Torr.

Elemental analysis of the adduct revealed the following:

|  | % C | % N | C/N | % H |
|---|---|---|---|---|
| Actual | 43.7 | 11.95 | 4.25 | 7.81 |
| Theoretical* | 43.22 | 11.86 | 4.25 | 7.68 |

*Calculated on assumption that the adduct was a mono-hydrate

EXAMPLE B

Preparation of DABCO-$C_4$- diquat dibromide 1,4-dibromobutane was used to prepare DABCO-$C_4$-diquat dibromide under substantially similar conditions and proportions as those used above to produce DABCO-$C_5$-diquat dibromide.

Elemental analysis of the adduct revealed the following

|  | % C | % N | C/N | % H |
|---|---|---|---|---|
| Actual | 42.8 | 12.46 | 4.01 | 7.07 |
| Theoretical* | 42.77 | 12.47 | 4.00 | 7.18 |

*Calculated on assumption that the adduct was DABCO-$C_4$-diquat.0.5 $H_2O$

EXAMPLE C

Aluminum nitrate, $Al(NO_3)_3.9H_2O$, 0.8 g, was dissolved in 40 g of water. A solution of 10.55 g of DABCO-$C_5$-diquat dibromide in 50 g of water was added, followed by a solution of 4.0 g of potassium hydroxide (86.0% KOH) in 25 g of water. Finally, 24 g of Hi-Sil (~87 percent $SiO_2$) was blended into the composite solution. The reaction mixture so prepared was then digested at 160° C. in a Teflon-lined static autoclave for 17.5 days. The final pH was 10.1. The crystalline product was filtered, washed with water until bromide-free and then dried at ambient temperature. It gave an X-ray diffraction pattern whose major lines are listed in Table 3. After a three hour calcination at 538° C., the X-ray diffraction pattern contained the major lines listed in Table 4. The sorptive capacities were found to be (g/100 g of calcined solid).

Cyclohexane, 200 Torr 1.5
n-Hexane, 20 Torr 2.4
Water, 12 Torr 5.0

Chemical composition of the dried sample, wt. percent
$SiO_2$: 73.0
$Al_2O_3$: 0.92
$K_2O$: 1.06
N: 2.99
Ash: 76.0
$SiO_2/Al_2O_3$ molar: 135

TABLE 3

X-Ray Diffraction Pattern of Product of Example C

| 2 Theta | d,A | $I/I_o$ |
|---|---|---|
| 4.45 | 19.8 | 73 |
| 15.55 | 5.7 | 6 |
| 16.73 | 5.3 | 6 |
| 17.15 | 5.17 | 11 |
| 17.81 | 4.98 | 14 |
| 18.77 | 4.73 | 12 |
| 20.52 | 4.33 | 16 |
| 21.49 | 4.14 | 14 |
| 22.43 | 3.96 | 23 |
| 23.16 | 3.84 | 14 |
| 24.00 | 3.71 | 22 |
| 24.88 | 3.58 | 100 |
| 26.48 | 3.37 | 81 |
| 28.12 | 3.17 | 17 |
| 28.61 | 3.12 | 18 |
| 30.23 | 2.957 | 8 |
| 31.68 | 2.825 | 5 |
| 34.14 | 2.627 | 3 |
| 34.68 | 2.587 | 3 |
| 36.24 | 2.479 | 5 |
| 43.65 | 2.074 | 3 |
| 45.12 | 2.010 | 4 |
| 45.96 | 1.975 | 3 |
| 49.12 | 1.855 | 20 |
| 50.81 | 1.797 | 3 |

TABLE 4

X-Ray Diffraction Pattern of Calcined Product of Example C

| 2 Theta | d,A | $I/I_o$ |
|---|---|---|
| 6.77 | 13.1 | 32 |
| 11.96 | 7.40 | 8 |
| 12.92 | 6.85 | 10 |
| 13.68 | 6.47 | 9 |
| 14.65 | 6.05 | 13 |
| 16.81 | 5.28 | 8 |
| 19.55 | 4.54 | 8 |
| 20.63 | 4.31 | 3 |
| 21.73 | 4.09 | 5 |
| 23.06 | 3.86 | 5 |
| 24.19 | 3.68 | 17 |
| 26.08 | 3.42 | 100 |
| 28.39 | 3.14 | 5 |
| 29.52 | 3.03 | 6 |
| 43.95 | 2.060 | 4 |
| 45.02 | 2.014 | 3 |
| 45.715 | 1.985 | 3 |
| 49.078 | 1.856 | 8 |

EXAMPLE D

Five grams of the product of Example C were calcined for 3 hours at 538° C. in flowing nitrogen after being heated slowly to this temperature. After three hours at 538° C., the nitrogen was replaced with air in order to burn off any carbon deposited. The calcined product was exchanged three times with 45 ml of 0.2 N ammonium acetate per gram of solid at 71° C. for 2 hours each in a sealed plastic jar. The product was filtered, washed with copious amounts of water and dried at ambient temperature. The dried material contained 0.01 percent of residual potassium. A sample of the ammonium-exchanged product was calcined for 3 hours at 538° C. Examination by X-ray diffraction showed the same pattern as given in Table 4. The product contained 1.16 wt. percent $Al_2O_3$ at 98.2 percent ash. It had an α-value of 0.5.

EXAMPLE E

A reaction mixture identical to that of Example C was crystallized at 180° C. The product obtained after 163 hours gave essentially the same X-ray Diffraction pattern as the product of Example C.

EXAMPLE F

The reaction mixture was identical to that of Example C except that the potassium hydroxide was replaced by 2.5 g of sodium hydroxide (about 98 percent). The crystalline product obtained after 161 hours was identical to that of Example C, but contained a minor amount of zeolite ZSM-12.

As pointed out above in the discussion of the "Background of the Invention", the DABCO adducts used herein can be used in the production of ZSM-12, as the major, or sole, crystalline product as described in U.S. Pat. No. 4,482,531. The parameters which control production of the new silicate, and thereby eliminate production of ZSM-12 or production of ZSM-12 in significant amounts have not been definitively delineated. The following observations concerning the experiments of Examples C, E and F pertain to only one of many potential experimental variables, that of the $OH^-/SiO_2$ mole ratio, and are considered illustrative, rather than definitive, at this time.

The reaction mixtures of Examples C, E and F had $OH^-/SiO$ molar ratios of 0.16. At higher $OH^-/SiO_2$ ratios of sodium containing reaction mixtures, the new silicate was obtained at short crystallization time (180 hours) at 60° C. Digestion at this temperature for about 300 hours yielded ZSM-12 as the main product.

EXAMPLE G

This example contains no deliberately added aluminum source, but Hi-Sil contains about 0.5 percent $Al_2O_3$.

A quantity of 10.55 g of DABCO-$C_5$-diquat bromide was dissolved in 65 g of water. A solution of 3.8 g of sodium hydroxide (about 98 percent) in 50 g of water was added, followed by 24 g of Hi-Sil. The well-blended reaction mixture was heated at 160° C. in a Teflon-lined autoclave. A crystalline product was isolated after 183 hours digestion at this temperature. The product had the X-ray diffraction pattern of the product of Example C and contained additionally a minor amount of ZSM-12. After calcination for 3 hours at 538° C. in air, the material had a surface area of 242 m²/g and the following sorptive capacities, g/100 of solid:

Cyclohexane, 20 Torr: 3.2
n-Hexane, 20 Torr: 2.8
Water, 12 Torr: 4.5

The chemical composition of the dried sample was (wt. percent)
$SiO_2$ (by difference): 71.8
$Al_2O_3$: 0.47
$Na_2O$: 0.59
N: 3.10
Ash: 72.9
$SiO_2/Al_2O_3$, molar: 260

EXAMPLE H

The product of Example G was precalcined and ion-exchanged as described in Example D. The dried material contained 0.2 percent residual sodium. The ammonium-exchanged product was calcined for 3 hours at 538° C. The X-ray diffraction pattern of this material was the same as listed in Table 2, but also contained a minor amount of ZSM-12. The calcined material contained 0.71 wt. percent of $Al_2O_3$ at 97.4 percent ash.

EXAMPLE I

Aluminum nitrate, $Al(NO_3)_3.9H_2O$ g, 0.8 g was dissolved in 40 g of water. Solutions of 10.2 g of DABCO-$C_4$-diquat dibromide in 50 g of water and of 4.95 g of potassium hydroxide (86%) in 25 g of water were added. Finally, 24 g of Hi-Sil, a precipitated silica containing about 87% of $SiO_2$, was blended into the solution. The reaction mixture was heated at 180° C. in a teflon-lined static pressure vessel for 191 hours. The x-ray diffraction pattern of the product is given in Table 5.

TABLE 5

| X-Ray Diffraction Pattern of the Product of Example I | | |
|---|---|---|
| 2 Theta | d,A | I/I |
| 4.42 | 20.0 | 37 |
| 17.42 | 5.09 | 10 |
| 18.31 | 4.84 | 7 |
| 18.86 | 4.70 | 8 |
| 19.65 | 4.52 | 7 |
| 22.45 | 3.96 | 10 |
| 23.97 | 3.71 | 23 |
| 25.22 | 3.53 | 100 |
| 26.57 | 3.35 | 41 |
| 27.78 | 3.21 | 36 |
| 28.30 | 3.15 | 25 |
| 30.61 | 2.921 | 6 |
| 36.33 | 2.473 | 4 |
| 49.03 | 1.858 | 32 |
| 50.73 | 1.800 | 8 |

The calcined form of the product of Example I gave an x-ray diffraction pattern with the same lines as exhibited by calcined products of Examples C and H, except for the lower apparent crystallinity, which does not permit separation of some of the weak lines. The low-angle peak of these calcined products can vary widely in intensity as a result of delamination and may even be absent in the extreme case.

EXAMPLE J

Aluminum nitrate, $Al(NO_3)_3.9H_2O$, 0.8 g, was dissolved in 40 g of water. Solutions of 10.2 g of DABCO-$C_4$-diquat dibromide in 50 g of water and of 3.1 g of sodium hydroxide (~98%) in 25 g of water were added. Finally, 24 g of Hi-Sil, a precipitated silica containing about 87% $SiO_2$, was blended into the solution. The reaction mixture was then heated at 160° C. in a Teflon-lined static autoclave for 410 hours. The x-ray diffraction pattern of the product was similar to that of Example I (Table 5). After a 3-hour calcination at 538 C, the x-ray diffraction pattern was similar to that of the calcined product of Example C (Table 4), but indicating lower apparent crystallinity. The sorptive capacities were found to be, g/100 g of calcined solid:

Cyclohexane, 20 Torr: 2.3
n-Hexane,, 20 Torr: 3.5
Water, 12 Torr: 7.5

EXAMPLE K

A quantity of 8 g of the product of Example J was calcined for 3 hours at 538° C. in flowing nitrogen. The nitrogen was then gradually replaced by air, and the calcination was continued until the carbon was burned off, allowing no more than 10° C. temperature rise.

The calcined material was ammonium exchanged in the same manner as described in Example H. The product had the following composition (wt. %):
SiO$_2$: 86.42
Al$_2$O$_3$: 1.0
Na: 0.01
N: 0.36
Ash: 87.72
SiO$_2$/Al$_2$O$_3$, molar: 147

The product of Ex. K was sized 14–25 mesh and calcined. It gave an alpha value of 2.6 and a constraint index of 0.9 at 1000° F. In agreement with this result, the material showed modest activities for dodecane cracking, aromatization of methyl-cyclohexane, oligomerization of propylene and isomerization of trans-butene and xylene.

EXAMPLE 1

The base material was synthesized by a procedure similar to that reported above. Aluminum nitrate, Al(NO$_3$)$_3$.9H$_2$O, pb 1.6 g. was dissolved in 80 g H$_2$O. A solution of 21.1 g of DABCO-C$_5$-diquat dibromide in 100 g of water was added, followed by a solution of 7.8 g of potassium hydroxide (87.2% KOH) in 50 g of water. Finally, 48 g of Hi-Sil (is 87% SiO$_2$) was blended into the composite solution. The mixture was digested in a stirred autoclave at 160° C. for about three days. The final pH was 12.29. The crystalline product was filtered, washed with water until bromide free and then dried at ambient temperature. It gave an x-ray diffraction pattern whose major lines are similar to that reported in Table 1.

The product was analyzed to contain:
8.6% carbon
2.27% nitrogen
0.85% Al$_2$O$_3$
70% Ash The balance is mainly SiO$_2$ and some K.

The air calcined sample (1000° F., 3 hours) has a surface area of 132 m /g and sorptive properties of 4.2% H$_2$O, 2.3% cyclohexane and 2.4% n-hexane.

The following treatments are listed to illustrate our invention:

EXAMPLE 2

Ten grams of above MCM-20 material in its "as synthesized" form was added to 100 ml of water. Dilute HCl solution (0.1N) was added to get a pH of 2 and the reaction mixture was maintained at this pH by the addition of HCl. After about 24 hours, the mixture was filtered, water-washed and dried. The dry solid was added to a mixture of 20 g. dimethylsulfoxide and 10 g n-octylamine at ambient temperature for 24 hours. The solid gave an x-ray diffraction pattern whose main low angle peak is at 3.5° (2 theta). The solid was then treated with 30 grams of tetraethyl orthosilicate (TEOS) at ambient temperature for about 21 hours. The solid was finally filtered and dried. The dried product had a low-angle line at 3.2° two theta. The sample was calcined in air at 1000° F. for 3 hours. The calcined product also had a low-angle peak at 3.2° indicating a basal spacing of 27.6Å. Its chemical composition has been determined and found to be, 87.9% SiO$_2$, 1.1% Al$_2$O$_3$, 0.29% Na and 93.6% ash. The sample has a surface area of 584 m$^2$/g and cyclohexane adsorption of 16.3 g/100 g of solid, indicating that it is a porous material capable of adsorbing large size hydrocarbon molecules. The material has an α-value of 0.5.

EXAMPLE 3

The same base material was treated with tetraethylorthosilicate (6.67 g/g catalyst) at ambient temperature for 72 hours followed by drying and calcining in air at 1000° F. for 3 hours. The resultant product has a 116 m$^2$/g surface area and H$_2$O adsorption 2.7%, cyclohexane 2.4% and n-hexane 2.2%. The result indicates that simple TEOS treatment did not open the layers of the base material to provide additional porosity.

EXAMPLE 4

The TEOS treated but uncalcined sample from Example 2 was contacted with 0.1N Al(NO$_3$)$_3$ solution at 212° F. for 4 hours. The exchanged sample was then filtered, washed and calcined in air at 1000° F. for 3 hours. The sample has an alpha value of 2 under standard test conditions. Re-exchange of the calcined sample with 0.1 N Al(NO$_3$)$_3$ and re-calcination yielded a product having an α-value of 3.

EXAMPLE 5

The TEOS treated but uncalcined sample (2.4 g) from Example 2 was treated with a solution of 0.3 g NaAlO$_2$ in 30 ml H$_2$O at ambient temperature for 4 hours followed by exchange with NH$_4$NO$_3$ solution to reduce sodium content to 0.08%. The sample was calcined in air at 1000° F. for 3 hours. The alpha value of the sample was tested and found to be 1.2. Exchange of the calcined sample with 0.1 N Al(NO$_3$)$_3$ and recalcination yielded a product having an α-value of 2.

What is claimed is:

1. A pillared silicate composition comprising
   a layered silicate, which exhibits an X-ray diffraction pattern of Table 1 of the specification; and
   (1) at least one oxide of an element from group IB, IIB, IIIA, IIIB, IVA, IVB, VA, VB, VIA, VIIA and VIIIA of the Periodic Table;
   (2) precursors of said at least one oxide; or
   (3) mixtures of (1) and (2);
      where said (1), (2) or (3) is interposed between layers of said layered silicate, to separate and support said layers.

2. The silicate composition of claim 1, wherein said element is selected from the group consisting of silicon and aluminum.

3. The silicate composition of claim 2, wherein silicon is provided as tetraalkylorthosilicate.

4. The silicate composition of claim 1, wherein the layered silicate contains aluminum in an amount such that the SiO$_2$:Al$_2$O$_3$ ratio ranges from about 12 to about 5000.

5. The silicate composition of claim 2, wherein the layered silicate contains in an amount such that the SiO$_2$:Al$_2$O$_3$ ration ranges from about 12 to about 5000.

6. The silicate composition of claim 3, wherein the layered silicate contains aluminum in an amount such that the SiO$_2$:Al$_2$O$_3$ ratio ranges from about 12 to about 5000.

7. A silicate composition comprising a layered silicate, which exhibits an X-ray diffraction pattern of Table 1 of the specification; and silica, tetraalkylorthosilicate; hydrolysis products of tetraalkylorthosilicate, or admixtures of silica and either tetraalkylorthosilicate or hydrolysis products of tetraalkylorthosilicate or both, interposed between laminae of said layered silicate to separate and support said laminae.

8. The silicate composition of claim 7, wherein the tetraalkylorthosilicate is tetraethylorthosilicate.

9. The silicate composition of claim 7, wherein the layered silicate contains aluminum in an amount such that the $SiO_2:Al_2O_3$ ratio ranges from about 12 to about 5000.

10. The silicate composition of claim 8, wherein the layered silicate contains aluminum in an amount such that the $SiO_2:Al_2O_3$ ranges from aobut 12 to about 5000.

11. A hydrocarbon conversion catalyst comprising the product of claim 1.

* * * * *

UNITED STATES PATENT AND TRADEMARK OFFICE
CERTIFICATE OF CORRECTION

PATENT NO. : 4,791,088

DATED : December 13, 1988

INVENTOR(S) : Pochen Chu et al.

It is certified that error appears in the above-identified patent and that said Letters Patent is hereby corrected as shown below:

"Column 13, line 32, "60°C" should read --160°C--.

Signed and Sealed this

Nineteenth Day of September, 1989

Attest:

DONALD J. QUIGG

Attesting Officer

Commissioner of Patents and Trademarks